UNITED STATES PATENT OFFICE.

CHARLES HERBERT THOMPSON, OF STOURBRIDGE, ENGLAND, ASSIGNOR OF ONE-HALF TO MAW & COMPANY, LIMITED, OF JACKFIELD, ENGLAND.

GLASS TILE, SLAB, OR THE LIKE.

No. 805,595.  Specification of Letters Patent.  Patented Nov. 28, 1905.

Application filed April 4, 1905. Serial No. 253,878.

*To all whom it may concern:*

Be it known that I, CHARLES HERBERT THOMPSON, fellow of the Chemical Society, analytical chemist, of Amblecote, Stourbridge, in the county of Stafford, England, have invented certain new and useful Improvements in and Relating to Glass Tiles, Slabs, or the Like, of which the following is a specification.

This invention relates to glass tiles, slabs, or the like, and has for its object to provide such tiles with simple and efficient means for securing them to walls, ceilings, and the like.

A tile, slab, or the like of opal or other glass made in accordance with this invention is provided on one side with pieces of flint, broken glass, or the like, which may be termed "keys" and by which the said tiles may be firmly fixed with the aid of a coating or bed of ordinary Portland or other suitable cement to walls, ceilings, or the like or upon bricks of burnt clay or other material, thus providing it or them with a facing of glass. The face of the tile may be left plain or it may be suitably decorated, as desired, by any well-known process.

In carrying out this invention I employ any silicofluorid which after dehydration is insoluble in water, but by preference a silicofluorid of lime, aluminium, and sodium, and I find the following proportions to be suitable, though I do not limit myself to the exact figures: two parts of natural cryolite or double fluorid of sodium and aluminium, two parts of potters' whiting or calcined dolomite, one part of fluorid of sodium, one part of "kaolin" or china-clay, six parts of liquid silicate of sodium. These materials are first mixed and ground together and then applied as a coating of any desired thickness upon the rear side of the glass, tile, or slab with the aid of a brush or other suitable appliance or by dipping, as in glazing earthenware tiles. Pieces of hard material—such as "bitsone," grain flint, chips of glass, bits of earthenware tiles, or a combination of these or like substances—are then sprinkled upon the coating. This backing is then allowed to dry and is then gradually warmed in a stove or other suitable apparatus to about 170° centigrade and then allowed to cool gradually.

When cold, the coating of silicofluorids will be found to have adhered very firmly to the glass, tile, or slab and to have become quite hard and insoluble in water. During the heating process the fluorids will have attacked or roughened the glass tile underneath the coating and the granular pieces will be found to have adhered firmly to the coating, thus providing keys or projections. The tile or sheet, if desired, can be cut to any required size. To lay the tile, it is "buttered" with any suitable cement and fixed in the ordinary manner of tile fixing, causing the adherence to the wall or other surface.

I am well aware of the fact that glass tiles have been made by fusing granular material with a strata of glass, painters' flux to a sheet of glass, and also by the use of silicates of zinc; but these are entirely outside and different from this invention.

What I claim, and desire to secure by Letters Patent, is—

1. The improved tile comprising a slab, a coating on the back of the slab, of a silicofluorid, which is insoluble in water after dehydration and pieces of silicious material applied thereto without fusing the silicofluorid, substantially as described.

2. The improved method of fixing pieces of silicious material to tiles consisting in the application, to the back of the tile of a solution of a silicofluorid which after dehydration is insoluble in water, and then sprinkling thereon the pieces of silicious material, and then drying, and warming without fusing the silicofluorid, and then gradually cooling the tile, substantially as described.

3. The improved method of fixing pieces of silicious material to tiles consisting in the application, to the back of the tile, of a silicofluorid of lime, aluminium and sodium which after dehydrating is insoluble in water, and then sprinkling thereon the pieces of silicious material and then drying, warming and gradually cooling the tile, substantially as described.

4. The improved method of fixing pieces of silicious material to tiles consisting in the application to the back of the tile, of a solution in liquid silicate of sodium of double fluorid of sodium and aluminium, calcined dolomite, fluorid of sodium, and kaolin which after dehydration is insoluble in water and then sprinkling thereon the pieces of silicious material and then drying, warming and gradually cooling the tile substantially as described.

5. The improved tile comprising a slab having a coating containing an unfused silicofluorid, and having applied thereto a plurality of keys fixed in place by said coating.

6. The method of fixing keys of granular material or the like to a tile or similar article, which consists in applying thereto a coating containing a silicofluorid, applying such material to said coating, heating such coating to a point below the fusing-point of such silicofluorid, and then cooling it.

7. An improved tile comprising a slab having a coating containing an unfused silicofluorid, and having its surface roughened to aid said coating in adhering thereto, and having applied thereto a plurality of keys fixed in place by said coating.

8. The method of fixing keys of granular material or the like to a tile or similar article, which consists in applying thereto a coating containing a silicofluorid, applying such material to said coating, causing the fluorin contained in said coating to act upon the surface of the tile to roughen it by heating such coating to a point below the fusing-point of such silicofluorid, and then cooling it.

In witness whereof I have hereunto signed my name in the presence of two subscribing witnesses.

CHARLES HERBERT THOMPSON.

Witnesses:
E. BARKER,
SIDNEY GEO. WEBB.